J. B. Raynor,
Rotary Churn.
No. 74,941.  Patented Feb. 25, 1868.
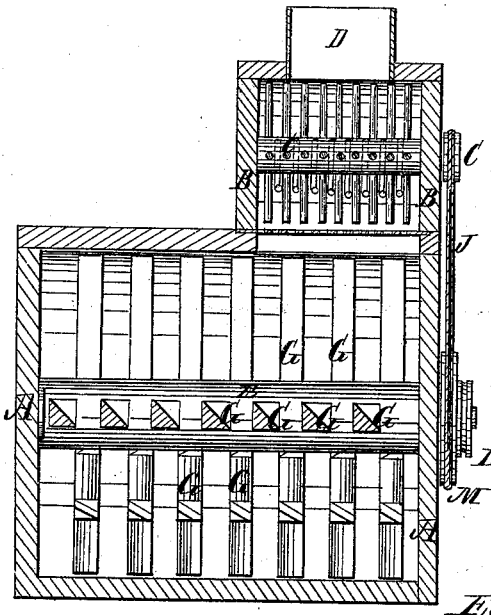
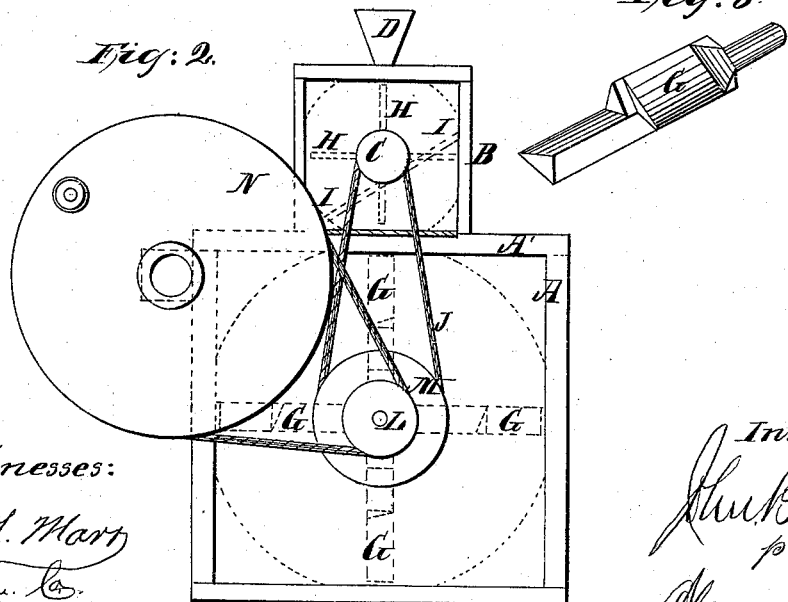

United States Patent Office.

JOHN B. RAYNOR, OF MAZO MANIE, WISCONSIN.

Letters Patent No. 74,941, dated February 25, 1868.

IMPROVEMENT IN CHURNS.

*The Schedule referred to in these Letters Patent and making part of the same.*

TO ALL WHOM IT MAY CONCERN:

Be it known that I, JOHN B. RAYNOR, of Mazo Manie, in the county of Dane, and in the State of Wisconsin, have invented certain new and useful Improvements in Churns; and do hereby declare that the following is a full, clear, and exact description thereof, reference being had to the accompanying drawings, and to the letters of reference marked thereon.

In the annexed drawings, making part of this specification, A represents a square churn-box, of any suitable dimensions, and provided with a cover, A'. The bottom of the churn-box, as well as the under side of this cover, are both made concave, as represented in red lines, Figure 2. E represents a horizontal shaft, which is placed centrally within the box A, and which has its bearings in the sides of said box. This shaft is provided, at one end, with two pulleys, M and L, and within the box with a series of arms, G G. These arms are made in the peculiar shape represented in Figure 3, with their angles so placed as to cut the milk or cream as they revolve with the shaft E. Placed upon the cover A' is a small box, B, which is provided with a suitable cover, and this cover with a funnel, D. A slot is cut through cover A', beneath box B, so as to open communication between the two, and this slot is covered with a perforated plate, or with gauze wire. Running across box B, in an inclined position, but parallel to each other, is a series of rods, I I. C represents a shaft, which is placed in a horizontal position in box B, and provided with a series of straight arms, H H. The ends of these arms cut between the rods I I when the shaft C is revolved. The shaft C has its bearings in the sides of the box, and is provided, upon its outer end, with a pulley, C'. A band, J, connects pulley C' to the pulley M on shaft E. N represents a large pulley, which is secured upon an axle, which is secured to one side of the box. This pulley is provided with a handle, by means of which it is revolved. A band, K, connects pulley N to pulley L on shaft E. When the operator turns the pulley-wheel N, the band K communicates motion to shaft E, and this shaft, through its pulley M and the band J, gives motion to shaft C.

In using this churn, the milk or cream is poured into the funnel D, and while being poured in, the shafts, with their arms, are set in motion. The milk is cut up by the arms and rods in box B, and then passes through the slot in the bottom of said box, to the box A, where it is subjected to the beating of the arms G G. The milk is rapidly broken by the combined action of the two shafts with their arms, and is made to yield its butter in a few moments.

What I claim, is—

The shaft C, provided with a series of straight arms, H H, when arranged in combination with the box B, having a series of rods, I I, in the manner and for the purposes set forth.

In testimony that I claim the foregoing, I have hereunto set my hand, this 1st day of October, 1867.

JOHN B. RAYNOR.

Witnesses:
 WM. W. JOHNSON,
 E. WOOD CORNIS.